Sept. 3, 1963 M. SCHNECK 3,102,767

ELECTRICAL CONNECTOR FOR FLAT CONDUCTOR CABLE

Filed Dec. 8, 1960 3 Sheets-Sheet 1

INVENTOR.
MARTIN SCHNECK

BY [signature]

ATTORNEY

Sept. 3, 1963 M. SCHNECK 3,102,767

ELECTRICAL CONNECTOR FOR FLAT CONDUCTOR CABLE

Filed Dec. 8, 1960 3 Sheets-Sheet 2

INVENTOR.
MARTIN SCHNECK

BY Harry [signature]

ATTORNEY

Sept. 3, 1963 M. SCHNECK 3,102,767

ELECTRICAL CONNECTOR FOR FLAT CONDUCTOR CABLE

Filed Dec. 8, 1960 3 Sheets-Sheet 3

INVENTOR.
MARTIN SCHNECK

BY Harry Lorence

ATTORNEY 3,102,767
ELECTRICAL CONNECTOR FOR FLAT CONDUCTOR CABLE

Martin Schneck, Old Bridge, N.J., assignor, by mesne assignments, to The Kent Manufacturing Co., Elizabeth, N.J., a corporation of New Jersey
Filed Dec. 8, 1960, Ser. No. 74,670
7 Claims. (Cl. 339—176)

Figures 1, 2:
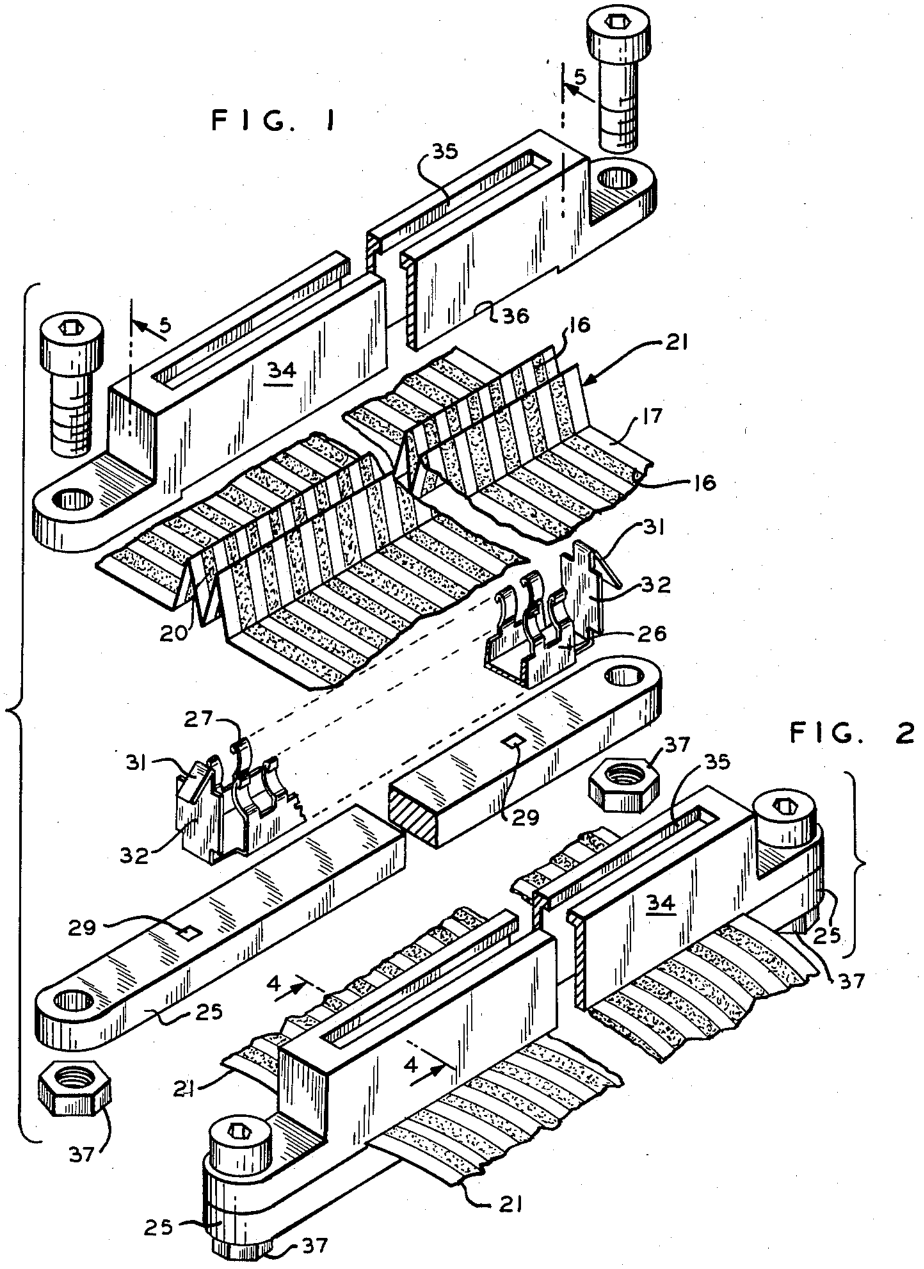

The connector of this invention enables a positive electrical connection to be made between a flat current carrier, such as bared flat conductor cable and printed circuit boards or other electrical flat components to be inserted into a novel spring pressed housing of the invention and thus electrically connected therein. The invention is especially adapted for but not limited to use with printed circuit component boards such as are used in computers and other devices utilizing flat conductor cable or flexible printed circuitry for inter-board connections. The invention provides one electrical joint for lowest resistance, making direct contact between the stripped cable and the board, and effecting substantial space saving in use and greater reliability than other methods used or proposed for the purpose. The invention provides means for making an electrical connection between a printed wiring board and flat conductor cables or other flat components by pressure contact, eliminating the necessity for soldered leads between the printed wiring board and the conventional round wire which, aside from being time consuming, may be responsible for unsatisfactory electrical connections.

A wiring board may be secured to the connector of this invention in a matter of seconds, making positive electrical contact; the installed cost is only a fraction of that of other means of contact.

Pursuant to the invention, after the flat conductor cable is stripped, it is preformed with a simple tool to wrap around a U or channel shaped spring which is snapped into the connector with the flat conductor cable wrapped around it, the spring locking itself into the connector; the connector with the cable therein is then ready to receive the printed circuit board. The spring is so formed as to enable the flat conductor cable to make direct contact with the printed circuit board, using the spring contact pressure. In other connectors electrical conductors must be individually crimped or soldered to a terminal which in turn makes contact with a printed circuit board. This invention eliminates one electrical joint, upping reliability; also eliminated are crimped or soldered joints conventionally used in such devices.

The spring pursuant to the invention not only supplies pressure for contact, but also is one piece and continuous, it carries no current, and may be snapped into the connector in a simple and rapid motion. Other printed board connectors have spring terminals which carry current and so cannot be constructed in one piece, and must be individually loaded into a connector.

The spring of this invention, after locking itself in the connector, locks the two-piece connector together and strain-relieves the electrical conductor so that it will always hold securely in place. The spring also aligns the electrical conductor with the printed wiring board. If there is a need to disassemble the connector, the self locking spring can easily be removed by the use of a simple tool.

The connector of this invention may be used to connect flat conductor cable to flat conductor cable by the use of a shim (FIG. 15), the end of the cable to be inserted inside the connector being folded around a shim to approximate the thickness of a printed circuit board. In this manner one may tap off a length of cable at any point along its path.

Pursuant to the invention, if a testing point were needed anywhere along the path of the flat conductor cable, the cable would be stripped, and formed at that point and a connector installed. A printed circuit board with parallel runs, terminating at eyelets or standoffs to accept test prods, would be inserted into the connector; the testing point is then ready for testing. When the testing point or station is not being used, the printed circuit board would be removed and a dust cover would be placed over the end of the connector.

The drawings, illustrating procedures and devices useful in carrying out the invention, and the description below, are exemplary only of the invention, which shall be deemed to cover all other devices and procedures coming within the scope and purview of the appended claims.

Figures 3, 4, 5:
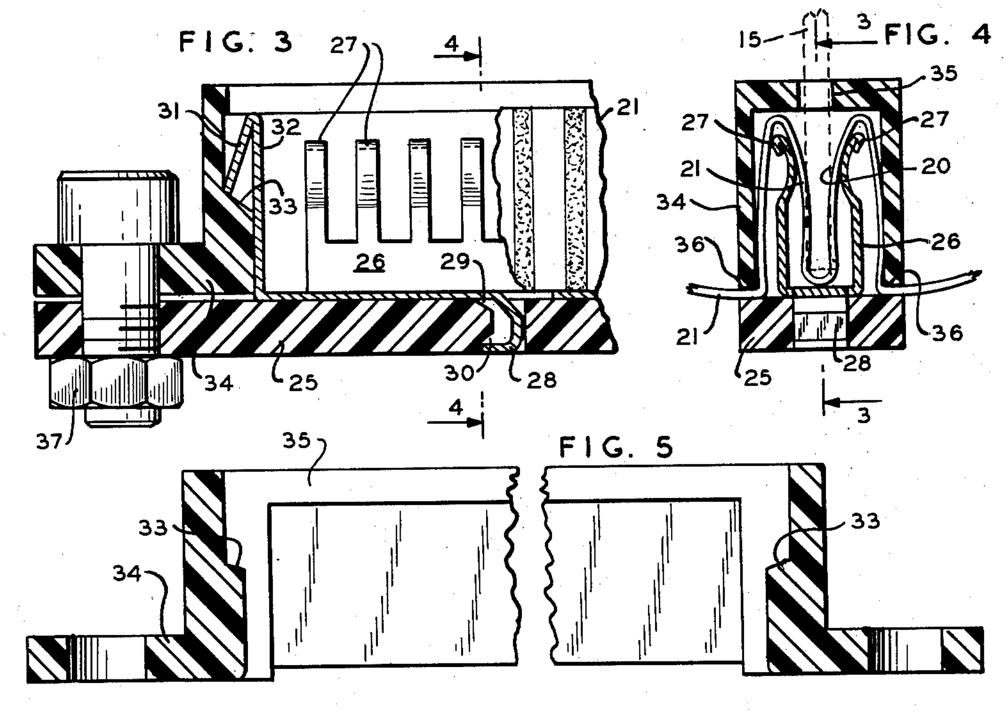
Figure 6:
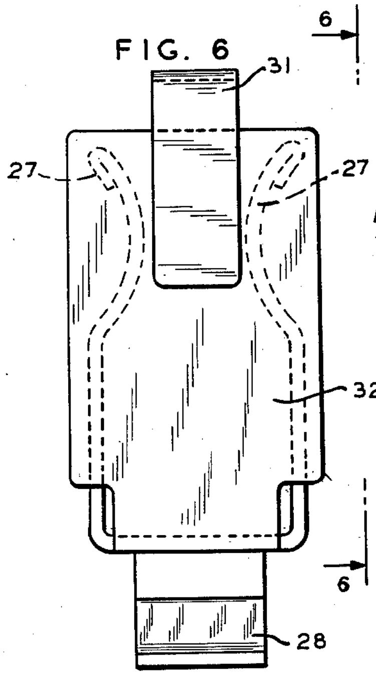
Figure 7:
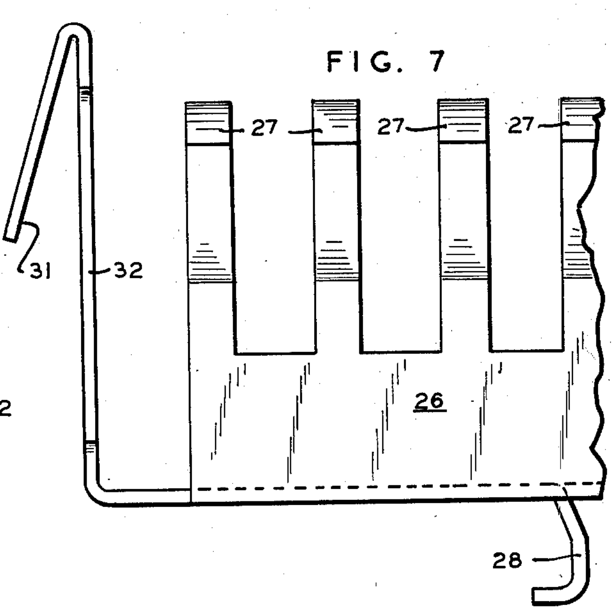
Figure 8:
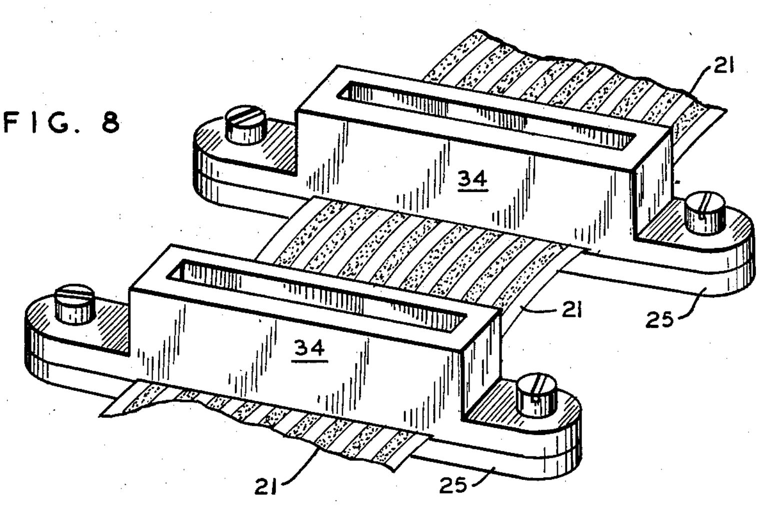
Figures 9, 10:
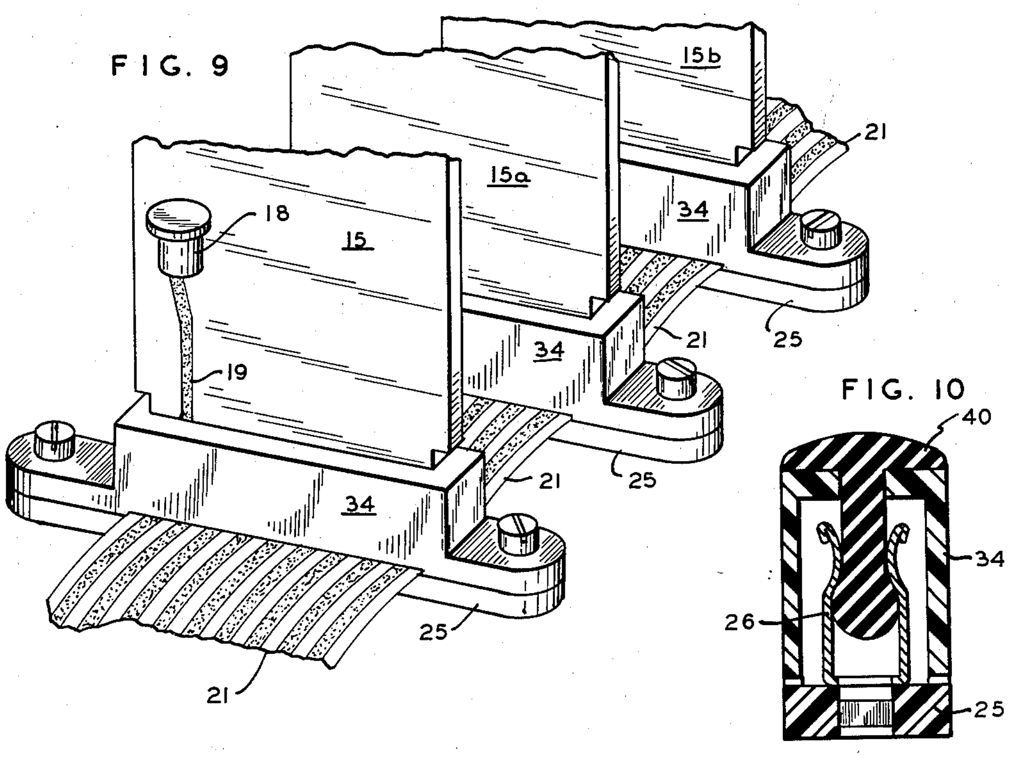

In the drawings, wherein similar reference characters indicate like parts:

FIG. 1 is a fragmentary, perspective view of a connector embodying the invention, the parts being shown exploded, FIG. 2 is a broken perspective view of the connector of this invention with a flexible cable shown secured thereto, FIG. 3 is a fragmentary sectional view of the assembly shown in FIG. 2, taken at line 3—3 of FIG. 4, FIG. 4 is a transverse sectional view taken at line 4—4 of FIG. 3, FIG. 5 is a longitudinal broken sectional view of the housing body, FIG. 6 is an enlarged end elevational view of the spring 26 shown in perspective in FIG. 1, taken at line 6—6 of FIG. 7, FIG. 7 is a fragmentary side elevational view thereof, FIG. 8 is a perspective view showing a pair of connectors of the invention arranged in line for connecting a plurality of boards to the flat conductor cable, FIG. 9 is a similar view showing boards connected to different points along the conductor cable, and FIG. 10 is a side elevational view of the connector closed by cap 40.

As shown in the drawings, this invention is designed for connection of electrical conductor carriers such as printed circuits on boards 15, 15*a*, 15*b* with the bared surfaces 20 of conductors 16 which are normally enveloped in the dielectric covering therefor 17 to define flat conductor cables 21; such cables are well known in this art. The invention is adapted to connect any of the various forms of conductor cables or other flat flexible conductors with circuits or elements of electrical component boards 15. The latter may be printed circuit or other electrical component connection boards; for example (FIG. 9) the board 15 carries an electrical component 18 having a printed lead 19. By stripping the dielectric coating 17 of cable 21 to expose the conductor ribbons 16 as at 20 (FIG. 1) and positioning said conductor cable 21 in the continuous spring 26 to define with the spring, essentially a U-shape (FIG. 4) for reception of the electrical component board 15, the so exposed surfaces 20 of the conductors 16 of the conductor cable 21 may be electrically connected with the printed circuit or other electrical components carried by the board 15. Thus the latter may be readily connected to and disconnected from selected conductors by the use of the connector of this invention and electrical components may be plugged into and out of connection therewith. Component boards 15, 15*a*, 15*b* (FIG. 9) may thus be connected with various preselected conductors 16 of the cable 21 or at predetermined points along cable 21.

A connector of this invention is shown in FIGS. 1 and 2 as comprising an elongated housing base 25, an elongated continuous spring 26 essentially U-shaped in transverse cross section (FIG. 4) the free ends 27 of said spring being directed outwardly of the housing base 25 on assembly therewith (FIG. 3). Interengaging means are provided on the spring and housing base for snap fitting the spring into latching engagement with the base and housing body 34, thus holding the parts assembled against accidental displacement. The spring 26 is slotted at its free ends to define spring fingers 27 extending therefrom in parallel spaced relation and the underside of the spring is provided with depending spring fingers 28 (FIG. 6) to engage apertures 29 (FIGS. 1 and 3). The housing base 25 is provided with undercut recesses 30 opening into said apertures. Thus the spring may be snap fitted into latching engagement with the housing base 25 and thereby assembled thereon. Further spring fingers 31 (FIGS. 6 and 3) may be formed at the ends of the spring and to extend from the longitudinal ends thereof or from end plates 32 formed at the ends of said spring (FIGS. 1, 6, 7). Undercut recesses 33 (FIG. 3) may be provided at the longitudinal ends of the housing body 34 to be engaged by said spring fingers 31 on assembly. The connector housing body 34 (FIGS. 1–5) may have an axial slot 35 for insertion of the board 15 therethrough and into engagement with the conductor cable, thus further facilitating assembly of the parts. The conductor cable 21 passes at one side (FIGS. 1 and 2) intermediate the housing body 34 which may be cut away as at 36 at the lower walls thereof and base 25 and into the spring 26 (FIG. 4) and then out of the opposite side of said housing body. The conductor cable thus defines essentially an M-shaped cross section within the housing body (FIG. 4) within the central U-shaped spring 26.

The parts may be juxtaposed as shown in FIG. 4 and then assembled by suitable bolt and nut means 37 (FIGS. 2, 3) together or vertically onto spaced rails 38 (FIG. 14) or horizontally or otherwise secured to base 25 (FIG. 10). The housing 34 may have a cover 40 snapped thereover (FIG. 10) to seal the parts until insertion of the component board 15 therein.

Having thus described my invention, what I claim as new and desire to secure by Letters Patent is:

1. An electrical connector comprising a non-conductive base, an elongated housing having an open bottom and comprising end walls, side walls, and a top wall provided with an axial slot for the reception of an edge portion of a flat electrical conductor carrier having conductive elements, and an elongated spring of substantially U-shaped cross section contained within said housing with the arms thereof spaced from said side and top walls, said housing and spring when in assembled relationship providing a passageway defined by the inner surface of said side and top walls and by said arms of said U-shaped spring and by a space between the housing and base, the opposed faces of the arms of said U-shaped spring underlying said axial slot in alignment therewith, a flexible conductor cable comprising conductors positioned within a dielectric covering, said cable having a portion thereof extending into said open bottom and through said passageway, said portion being deformed to a substantially M-shaped longitudinal section including a loop disposed between the arms of said U-shaped spring, the opposed faces of said loop having said dielectric covering removed from one side thereof to expose the opposed faces of the looped portion of said conductors, and means to secure said base to said housing to close said open bottom and to confine said deformed portion within said housing while permitting portions of said conductor cable adjacent said deformed portion to extend between said housing and said base to the exterior of said connector, said edge portion of said electrical conductor carrier extending through said slot and contacting said portion of said conductor cable and establishing a conductive contact between said conductive elements of said electrical conductor carrier and said conductors of said cable.

2. The combination of claim 1 wherein said means to secure said base to said housing includes complementary fingers on said spring and undercut recesses in the housing and base.

3. The combination of claim 1 wherein the arms of said U-shaped spring comprise a plurality of parallel spaced spring fingers.

4. A supporting connector for mounting a conductor carrier having conductive elements extending to at least one edge portion thereof, and for electrically connecting said conductive elements to bare portions of conductors in a flat flexible conductor cable, said supporting connector comprising, a base; an elongated housing having an open bottom and comprising end walls, side walls, and a top wall provided with an axial slot for the reception of said edge portion of said conductor carrier; and an elongated spring of substantially U-shaped cross section contained within said housing with the arms thereof spaced from said side and top walls; said housing and spring when in assembled relationship providing a passageway defined by the inner surface of said side and top walls and by said arms of said U-shaped spring and by a space between the housing and base, the opposed faces of the arms of said U-shaped spring underlying said axial slot in alignment therewith; and means to secure said base to said housing to close said open bottom while permitting a flexible conductor cable to be extended between said side walls and said base and through said passageway and to include a loop having bare opposed faces disposed within the arms of said U-shaped spring.

5. The supporting connector of claim 4 wherein said means to secure said base to said housing includes complementary fingers on said spring and undercut recesses in the housing and base.

6. The supporting connector of claim 4 wherein the arms of said U-shaped spring comprise a plurality of parallel spaced spring fingers.

7. The supporting connector of claim 4 including a cover comprising an elongated non-conductive element of substantially T-shaped cross section, the leg of said T-shaped cross section being proportioned to extend through said axial slot and between the opposed faces of said U-shaped spring in tight engagement therewith whereby said spring retains said cover in place.

References Cited in the file of this patent

UNITED STATES PATENTS

| | | |
|---|---|---|
| 2,691,147 | Sutton et al. | Oct. 5, 1954 |
| 2,825,042 | Tollefson et al. | Feb. 25, 1958 |
| 2,870,424 | Franz | Jan. 20, 1959 |
| 2,886,681 | Bourns et al. | May 12, 1959 |
| 2,927,251 | Jones et al. | Mar. 1, 1960 |
| 3,059,211 | Thomas et al. | Oct. 16, 1962 |